United States Patent [19]

Servè

[11] Patent Number: 4,693,499
[45] Date of Patent: Sep. 15, 1987

[54] PIPELINE FOR GASEOUS FLUIDS AND METHOD OF ASSEMBLING ITS COMPONENTS

[75] Inventor: Klaus Servè, Radevormwald, Fed. Rep. of Germany

[73] Assignee: Manibs. R. Mannesmann GmbH. & ibs Nagel GmbH. & Co. KG, Remscheid-Bliedinghausen, Fed. Rep. of Germany

[21] Appl. No.: 805,957

[22] Filed: Dec. 5, 1985

[51] Int. Cl.[4] .............................................. F16L 13/02
[52] U.S. Cl. ........................................ 285/96; 285/286; 29/157 R
[58] Field of Search ..................... 285/96, 97, 286, 21, 285/22; 29/157 R

[56] References Cited

U.S. PATENT DOCUMENTS

| | | | |
|---|---|---|---|
| 1,800,085 | 4/1931 | Kroeger et al. | 285/96 X |
| 1,898,623 | 2/1933 | Gammeter | 285/96 |
| 2,922,664 | 1/1960 | Risley et al. | 285/96 |
| 3,038,022 | 6/1962 | Scott | 285/96 X |
| 3,516,689 | 6/1970 | Binford et al. | 285/286 X |
| 3,516,690 | 6/1970 | Kreig | 285/286 X |
| 3,582,112 | 6/1971 | Pico | 285/96 |
| 3,600,010 | 8/1971 | Downs et al. | 285/286 X |
| 3,737,179 | 6/1973 | White, Jr. | 285/96 |

FOREIGN PATENT DOCUMENTS

| | | | |
|---|---|---|---|
| 563050 | 10/1932 | Fed. Rep. of Germany | 285/286 |
| 3423952 | 6/1984 | Fed. Rep. of Germany | . |
| 1260714 | 4/1961 | France | 285/286 |
| 8518 | 1/1977 | Japan | 285/286 |

Primary Examiner—Thomas F. Callaghan
Attorney, Agent, or Firm—Peter K. Kontler

[57] ABSTRACT

A pipeline wherein one end portion of a first metallic pipe fits with annular clearance into the adjacent end portion of a second metallic pipe and the adjacent end portion has an internal groove for a radially and axially deformable ring which is biased radially inwardly and axially by a supply of gaseous, liquid or paste-like medium in the radially outermost part of the groove so that the free end of the adjacent end portion can be welded to the one end portion while the pipes convey a compressed gaseous fluid.

20 Claims, 3 Drawing Figures

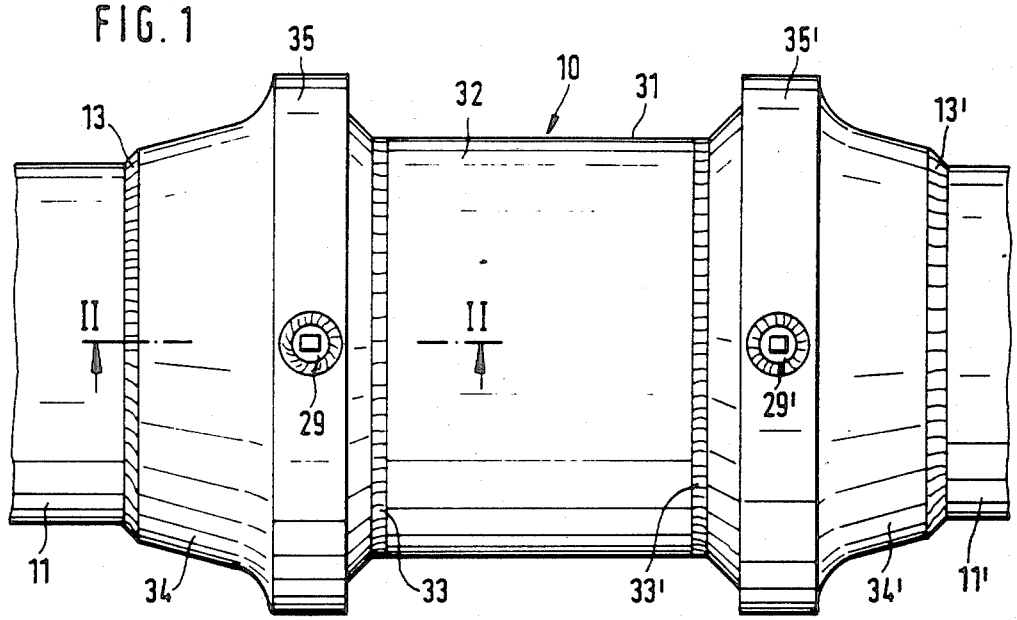
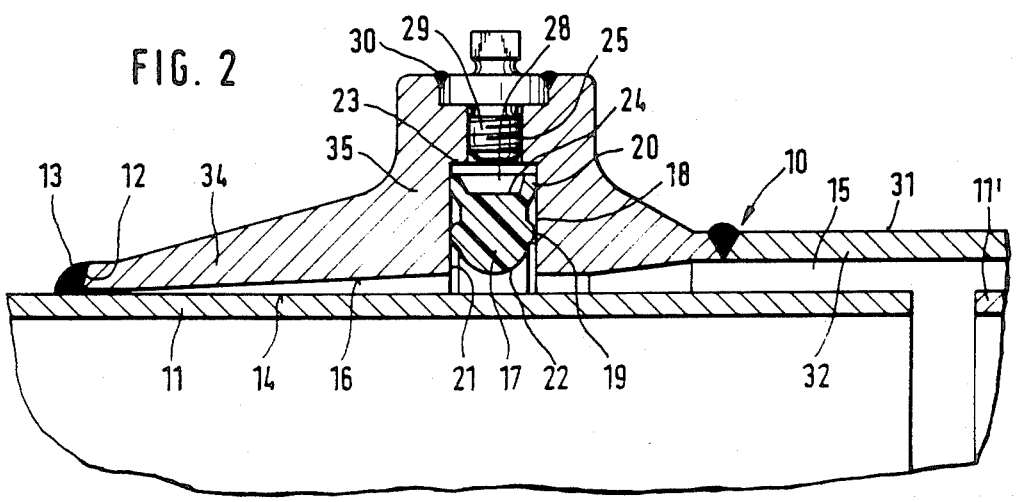

PIPELINE FOR GASEOUS FLUIDS AND METHOD OF ASSEMBLING ITS COMPONENTS

BACKGROUND OF THE INVENTION

The present invention relates to pipelines in general, and more particularly to improvements in pipelines which can be used to convey compressed gaseous fluids and are assembled of two or more tubular components or members. The invention further relates to a method of assembling the components of a pipeline.

German patent application No. 34 23 952.9 discloses a pipeline wherein one (first) end portion of a first tubular member is inserted into one (second) end portion of a second tubular member. The internal surface of the second end portion has a circumferentially complete groove for a ring of soft elastomeric material (e.g., rubber or an elastic plastic substance) which is caused to sealingly engage the first and second end portions so that these end portions can be welded to each other as soon as the ring is caused to undergo deformation which is required to establish a satisfactory seal with each of the two end portions. This renders it possible to weld the first and second end portions to each other while the respective tubular members convey a compressed gaseous fluid. As a rule, the welding operation involves the application of an annular weld or seam along the end face of the second end portion.

The ring has two annular sealing lips including an outer and an inner lip, as considered in the radial direction of the groove. The inner lip is acted upon by compressed gaseous fluid in the pipeline and is thereby maintained in sealing engagement with the external surface of the first end portion. The outer lip is also deformed by the compressed gaseous fluid in the pipeline and is thereby biased against the (bottom) surface in the radially outermost portion of the groove. In other words, the inner lip is biased radially inwardly (against the first end portion) and the outer lip is biased radially outwardly (against the second end portion). The two lips face away from the free end of the second end portion, i.e., in a direction such that they can be acted upon and deformed by compressed gaseous fluid in the pipeline. The flow of compressed gaseous fluid through the pipeline is interrupted during insertion of the first end portion into the second end portion (at such time, the sealing ring in the internal groove of the second end portion slides along the external surface of the first end portion and/or vice versa). The admission of compressed gaseous fluid into the pipeline is resumed as soon as the insertion of the first end portion into the second end portion is completed so that the fluid can deform the two lips in the aforedescribed manner. The ring then prevents leakage of the compressed gaseous fluid and allows for the application of an annular weld while the pressure in the pipeline exceeds the pressure in the surrounding atmosphere. The pressure of gaseous fluid must suffice to ensure that the inner lip is held in a requisite sealing engagement with the external surface of the first end portion (the gaseous fluid acts upon the outer side of the inner lip), and that the outer lip is held in requisite sealing engagement with the bottom surface in the groove of the second end portion (the gaseous fluid acts upon the inner side of the outer lip). The inner diameter of the ring and the diameters of the lips thereon must be selected in dependency on the inner diameter of the second end portion, on the outer diameter of the first end portion and on the diameter of the bottom surface in the radially outermost portion of the groove. The inner diameter of the ring and the inner diameter of the inner lip cannot be reduced below a certain value because this would prevent the first end portion from entering the second end portion while the ring is installed in the internal groove of the second end portion. On the other hand, the selection of a small inner diameter for the ring and for its inner lip would enhance the sealing action of the ring, particularly between the inner lip and the external surface of the first end portion. Moreover, the sealing action of the ring is dependent practically exclusively upon its weakest parts i.e., upon the two lips, because one of the lips is used to sealingly engage the first end portion and the other lip is caused to sealingly engage the second end portion. Still further, it is rather difficult to ascertain whether or not the lips of the ring are in proper positions for the establishment of satisfactory seals when the insertion of the first end portion into the second end portion is completed.

OBJECTS AND SUMMARY OF THE INVENTION

An object of the invention is to provide a novel and improved method of assembling the tubular components of a pipeline while the pipeline conveys a pressurized flowable medium, such as a compressed gaseous fluid.

Another object of the invention is to provide a method which ensures the establishment of a satisfactory seal between two tubular members or components, whose end portions are telescoped into each other, even if the inner diameter of the surrounding end portion and/or the outer diameter of the surrounded end portion deviates from the desired value.

A further object of the invention is to provide a method which allows for convenient and practically unimpeded insertion of the end portion of one tubular component into the end portion of the other tubular component and such convenient and unimpeded insertion does not adversely affect the quality of the seal which is to be established between the two end portions.

An additional object of the invention is to provide a method which renders it possible to regulate the sealing action while the pipeline is in actual use and which renders it possible to intensify or to weaken the sealing action irrespective of whether or not the pipeline conveys a pressurized flowable medium.

Still another object of the invention is to provide a pipeline which is assembled in accordance with the above outlined method.

Another object of the invention is to provide novel and improved means for establishing and maintaining a seal between two tubular components, which are telescoped into each other, while the pressure in such components deviates from the pressure in the surrounding area.

A further object of the invention is to provide novel and improved tubular members which can be used in the above outlined pipeline.

One feature of the invention resides in the provision of a method of sealingly connecting two tubular members having end portions one of which can be introduced into the other, particularly of establishing a welded connection between two pipes of a pipeline for compressed gaseous fluids. The method comprises the steps of providing the internal surface of the other end portion with a circumferentially complete groove, inserting into the groove a deformable ring-shaped seal, introducing the one end portion into the other end portion so that the free end of the other end portion and the seal surround the external surface of the one end portion, deforming the seal in the groove in a direction radially inwardly as well as axially into sealing engagement with the two end portions, and thereupon bonding the free end of the other end portion to the external surface of the one end portion. The deforming step preferably comprises introducing a pressurized flowable medium (such as nitrogen, water or grease) into the groove radially outwardly of the seal. The method can further comprise the step of conveying a compressed gaseous fluid through the end portions of the tubular members subsequent to the deforming step but prior to the bonding step, i.e., the two end portions can be welded or otherwise bonded to each other while the pressure in the tubular members deviates from (e.g., exceeds) the pressure in the surrounding atmosphere.

Another feature of the invention resides in the provision of a pipeline, particularly a pipeline for compressed gaseous fluids, which comprises a first tubular member (such as a metallic pipe) including a first end portion having a preferably cylindrical external surface, a second tubular member (such as a metallic pipe) including a second end portion having a preferably cylindrical internal surface surrounding the external surface of the first end portion, a free end, and a ring-shaped groove extending radially outwardly from the internal surface, means (e.g., an annular weld) for bonding the free end of the second end portion to the first end portion, a deformable ring (e.g., a ring made of rubber or a soft elastomeric synthetic plastic material) in the groove, and means for deforming the ring radially inwardly and axially into sealing engagement with the second end portion in the groove as well as with the external surface of the first end portion so as to allow for the application of the bonding means (e.g., for welding of the free end of the second end portion to the external surface of the first end portion) while the pressure in the tubular members deviates from (and normally exceeds) the pressure in the surrounding atmosphere. The second end portion has a circumferentially complete bottom surface in the radially outermost portion of the groove to define with the ring an annular plenum chamber, and the deforming means can include means for maintaining the plenum chamber at a pressure which exceeds the pressure in the tubular members to thus urge the ring radially inwardly whereby the ring expands axially as a result of deformation on engagement with the external surface of the first end portion. The pressure differential between the chamber and the interior of the tubular members can approximate or exceed 3 bar.

The second end portion has two substantially radially extending lateral surfaces which flank the groove, and the ring is preferably formed with at least one first annular lip which surrounds the first end portion and is adjacent to one lateral surface as well as at least one second annular lip which surrounds the first end portion and is adjacent to the other lateral surface. The ring can be formed with several (preferably two) first lips and with several (preferably two) second lips. Furthermore, the ring can be formed with a convex inner surface which is adjacent to the external surface of the first end portion and with a concave outer surface which is inwardly adjacent to the plenum chamber.

The second end portion is preferably formed with at least one passage which extends between the plenum chamber and the external surface of the second end portion, and the deforming means can include means for admitting into the plenum chamber a pressurized flowable medium by way of the passage. Such admitting means can comprise a conduit which is connected with a source of pressurized flowable medium and one end portion of which is sealingly received in the passage or is otherwise sealingly connected to the second end portion to communicate with the passage, and a shutoff valve which is installed in the conduit. When the bonding of the second end portion to the first end portion is completed (or even prior to such bonding), the conduit can be detached from the second end portion and the passage can be sealed by a bung or another suitable plug which is received in the passage and is, or can be, welded to the second end portion.

The second end portion can include a thin-walled first tubular section and a thick-walled second tubular section which is integral with (e.g., welded to) the first section and is provided with the aforementioned groove.

The deforming means can include a supply of compressed gaseous fluid (particularly nitrogen) in the plenum chamber. Alternatively, the deforming means can comprise a supply of a suitable hydraulic fluid (particularly water) or a supply of a viscous medium (particularly grease) in the plenum chamber.

The second tubular member can include a third tubular end portion having a second internal surface, a second free end and a second ring-shaped groove extending radially outwardly from the second internal surface. Such pipeline then further comprises a third tubular member (e.g., a metallic pipe) including a fourth end portion having a second external surface which is surrounded by the second internal surface and the second free end, second bonding means (particularly an annular weld) for bonding the second free end to the fourth end portion, a second deformable ring which is installed in the second groove, and means for deforming the second ring radially and axially into sealing engagement with the third end portion in the second groove as well as with the second external surface so as to allow for the application of the second bonding means while the pressure in the tubular members deviates from the pressure in the surrounding atmosphere. The second tubular member can constitute a metallic sleeve whose (second and third) end portions are mirror symmetrical to each other with reference to a plane which is normal to the axis of the sleeve and is disposed midway between the two free ends of the sleeve. Each of the deforming means can include or constitute a supply of pressurized flowable medium which is confined in the respective groove around the corresponding ring so that the latter is urged radially inwardly into sealing engagement with the respective external surface as well as axially into sealing engagement with the second tubular member all the way around the respective external surface.

The novel features which are considered as characteristic of the invention are set forth in particular in the appended claims. The improved pipeline itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary elevational view of a pipeline which embodies one form of the invention, with the two end portions of the second tubular member welded to the end portions of the first and third tubular members;

FIG. 2 is an enlarged fragmentary axial sectional view as seen in the direction of arrows from the line II—II of FIG. 1 and shows the groove and the deformable ring in one end portion of the second tubular member.

DESCRIPTION OF THE PREFERRED EMBODIMENTS

Figure 3:
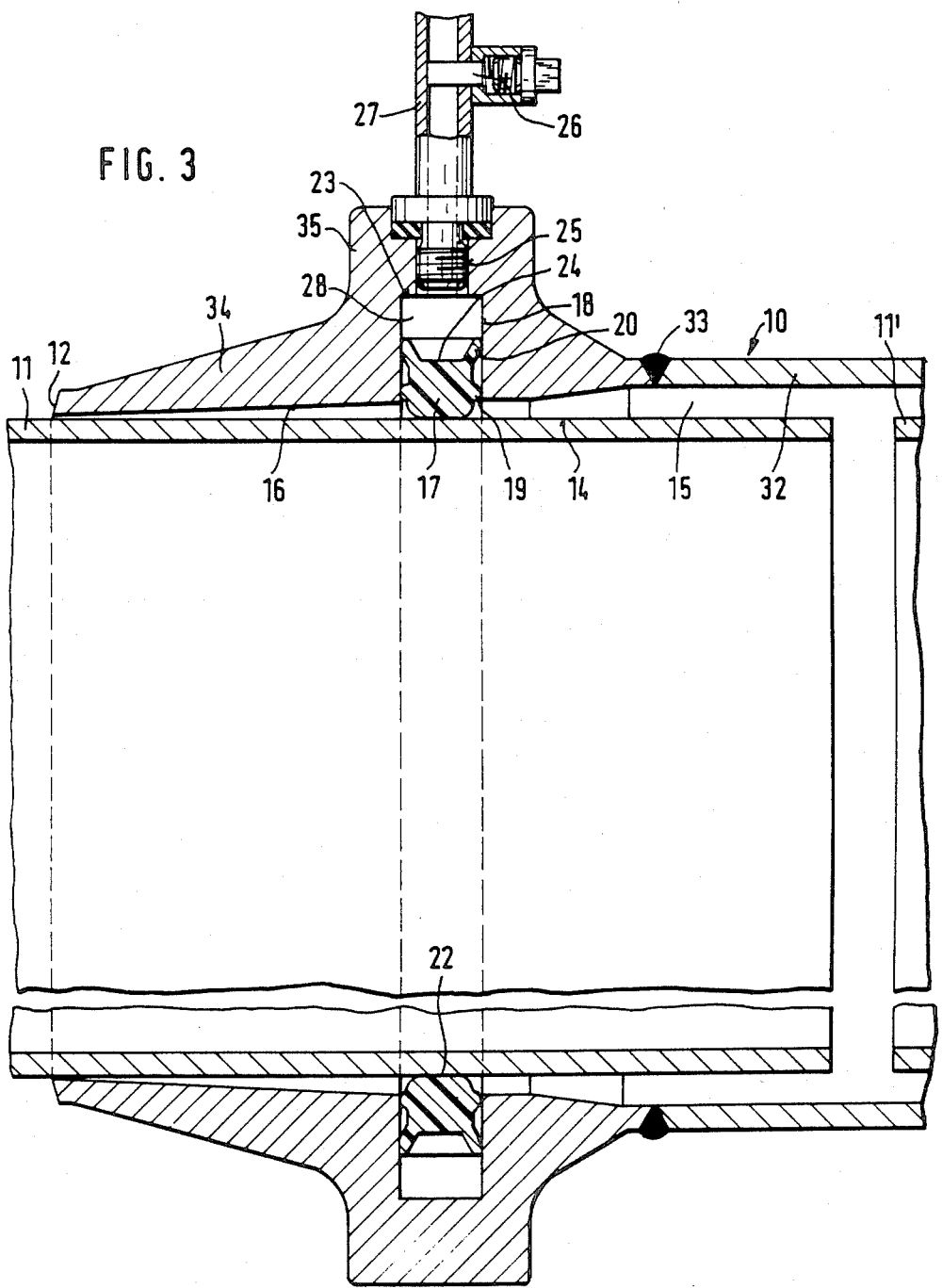
FIG. 3 is another fragmentary axial sectional view of the pipeline and shows the means for admitting a pressurized flowable medium into the plenum chamber in one end portion of the second tubular member.

FIG. 1 illustrates a portion of a pipeline which includes a first tubular component or member having an end portion 11, and a second tubular component or member including a sleeve 10. The end portion 11 of the first component has an external surface 14 (FIG. 2) which is spacedly surrounded by the internal surface 16 of the respective end portion (including a part of a thin-walled tubular section 32 and the thick-walled tubular section 34) of the sleeve 10. The surfaces 14 and 16 define an annular clearance 15 which communicates with the interior of the pipeline, i.e., with the path along which a compressed gaseous fluid flows from the tubular member including the end portion 11 into the tubular member including the sleeve 10 or vice versa. The end face 12 of the end portion including the sections 32, 34 of the sleeve 10 is bonded to the external surface 14 of the end portion 11 by an annular weld 13. The sections 32, 34 of the left-hand end portion of the sleeve 10 are welded to each other, as at 33.

In accordance with a feature of the invention, the annular weld 13 can be formed while the tubular members or components of the pipeline convey a pressurized flowable medium, e.g., a compressed gaseous fluid. To this end, the internal surface 16 of the maximum-diameter portion or bead 35 of the tubular section 34 is formed with a circumferentially complete groove 18 for a ring-shaped seal 17, e.g., a deformable sealing ring which is made of rubber or an elastomeric synthetic plastic material. The groove 18 is flanked by two radially extending lateral surfaces 21 and by a circumferentially and axially extending (bottom) surface 23 in the deepmost portion of the groove. The ring 17 has a normally convex inner surface 22 which can be moved into sealing engagement with the external surface 14 of the end portion 11, and a normally concave outer surface 24 which defines with the bottom surface 23 an annular plenum chamber 28. A flowable medium (e.g., nitrogen, water or grease) can be introduced into the chamber 28 to serve as a means for deforming the ring 17 radially inwardly as well as axially (as a result of engagement between the external surface 14 and the inner surface 22) so that the ring is held in highly satisfactory sealing engagement with the end portion 11 of the first tubular member as well as with the end portion 32, 34 of the sleeve 10.

The right-hand side of the ring 17 which is shown in FIGS. 2 and 3 has two annular lips 19 and 20 which are adjacent to the respective radial wall 21, and the left-hand side of the ring 17 is formed with two similar lips 19, 20 which contact the adjacent radial wall 21. The lips 19 and 20 spacedly surround the end portion 11. The bead 35 of the tubular section 34 has a passage 25 in the form of a tapped bore which communicates with the plenum chamber 28 and extends to the external surface 31 of the sleeve 10. As shown in FIG. 3, the means for deforming the ring 17 radially inwardly and axially at a certain stage of assembly of the pipeline includes a conduit 27 containing a shutoff valve 26. One end portion of the conduit 27 has external threads so that it can be threadedly engaged with the bead 35 by extending into the passage 25, and the other end portion of the conduit 27 is connected with a source (not shown) of a pressurized gaseous, liquid or other suitable flowable medium, e.g., nitrogen, water or grease.

The sleeve 10 and the tubular component or member including the end portion 11 are assembled as follows:

The ring 17 is inserted into the groove 18 of the bead 35 before the end portion 32, 34 of the sleeve 10 is slipped onto the end portion 11 so that the surfaces 14, 16 define the clearance 15. The inner diameter of the ring 17 (i.e., the diameter of the convex inner surface 22) can be selected in such a way that it exceeds the diameter of the preferably cylindrical external surface 14, even if the diameter of the surface 14 and/or 22 deviates from an anticipated standard value. The discharge end of the conduit 27 is sealingly received in the tapped bore or passage 25 with the interposition of a suitable gasket (shown in FIG. 3), and the valve 26 is then opened to admit the pressurized deforming medium into the plenum chamber 28 at a pressure such that the ring 17 is deformed radially inwardly as well as axially to move the surface 22 into sealing engagement with the external surface 14 of the end portion 11 as well as to deform the two pairs of lips 19, 20 into sealing engagement with the adjacent lateral surfaces 21 in the groove 18 so that the ring 17 is maintained in sealing engagement with the end portion 11 as well as with the end portion 32, 34 to prevent the flow of a fluid between the end face 12 of the tubular section 34 and the interior of the pipeline. At such time, the pipeline can be put to use even before the operators apply the weld 13 in order to sealingly secure the free end of the section 34 to the end portion 11. The weld 13 can be applied along the end face 12 (as actually shown) or at any location between the end face 12 and the left-hand lateral surface 21. The medium which fills the plenum chamber 28 is maintained at a pressure which exceeds the pressure in the interior of the pipeline, at least prior to and during the making of the weld 13. The difference between the pressure in the chamber 28 and the pressure in the clearance 15 to the right of the ring 17, as viewed in FIG. 3, can approximate or exceed 3 bar. The establishment and maintenance of a requisite pressure in the chamber 28 can be readily ensured by closing the shutoff valve 26 as soon as the ring 17 is deformed to assume the condition which is shown in FIG. 3.

The valve 26 can be opened again when the making of the weld 13 is completed so that the ring 17 is free to expand and to penetrate deeper into the groove 18, i.e., to expand radially outwardly toward the bottom wall 23. The fluid which flows through the pipeline cannot escape because such fluid deforms the ring 17 to thereby maintain the four lips 19 and 20 in sealing engagement with the adjacent surfaces 21 and 23, i.e., the ring 17 continues to seal the clearance 15 from the chamber 28. The conduit 27 is then detached from the sleeve 10 and the passage 25 can be sealed by a bung 29 or a similar plug (see FIGS. 1 and 2) whose externally threaded shank mates with the bead 35 in the bore or passage 25. In order to prevent leakage of the confined gaseous fluid and/or to prevent penetration of air into the chamber 28, the marginal portion of the head of the plug 29 is preferably welded to the sleeve 10 (as shown at 30 in FIGS. 1 and 2). The plug 29 can further serve to maintain the flowable medium in the chamber 28 at a pressure which exceeds the pressure in the tubular components of the pipeline (and in the clearance 15 to the right of the ring 17, as viewed in FIG. 2). This can be achieved in a particularly simple manner by filling the chamber 28 with a liquid or viscous flowable medium which is thereupon pressurized in response to penetration of the shank of the plug 29 into the passage 25. As mentioned above, the pressure differential between the chamber 28 and the interior of the pipeline can be in the range, or in excess, of 3 bar. The establishment and maintenance of such pressure differential (even when the making of the weld 13 is completed) is desirable in order to keep the inner surface 22 of the ring 17 in sealing engagement with the external surface 14 of the end portion 11.

The making of the groove 18 in the bead 35 of the tubular section 34 renders it possible to keep the wall thickness of the remaining section (32) of the respective end portion of the sleeve 10 to a minimum without adversely affecting the reliability of the connection between the sleeve and the end portion 11. The aforementioned weld 33 connects the sections 32, 34 to each other in the region of the bead 35.

The left-hand end portion of the sleeve 10 includes a tubular section 34' with a bead 35' and the adjacent portion of the tubular section 32. The sections 32 and 34' are sealingly secured to each other by an annular welded seam 33'. The manner in which the right-hand end portion of the sleeve 10 is sealingly secured to the end portion 11' of the third tubular component of the pipeline is the same as shown for the end portions 32, 34 (sleeve 10) and 11. Thus, the bead 35' has an internal groove corresponding to the groove 18 for a deformable ring (corresponding to the ring 17), and such ring is deformed by a pressurized flowable medium which fills the respective plenum chamber and is maintained at a requisite pressure by a plug 29'. The two end portions of the sleeve 10 are mirror symmetrical to each other with reference to a plane which extends at right angles to the axis of the sleeve 10 and is located midway between the beads 35 and 35'. The end portion 32, 34 can be connected to the end portion 11 simultaneously with the establishment of a seal between the end portion 32, 34' and the end portion 11', or one of the welds 13, 13' can be formed prior to the making of the other weld. If one of the welds 13, 13' is formed ahead of the other weld, the parts 11, 10 or 10, 11' can be said to constitute a composite tubular component or member which is thereupon sealingly connected with the other tubular member (including the end portion 11' or 11).

An important advantage of the improved method of assembling the tubular components of the pipeline is that the ring 17 can establish a satisfactory seal between the end portions 11 and 32, 34 regardless of the difference between the diameter of the external surface 14 of the end portion 11 and the diameter of the convex inner surface 22. Thus, the diameter of the surface 22 can greatly exceed the diameter of the surface 14 before the ring 17 is subjected to deforming stresses so that the end portion 11 can be readily introduced into the respective end portion 32, 34 of the sleeve 10. The diameter of the surface 22 can be selected in such a way that the ring 17 can be readily slipped onto the end portion 11 even if the diameter of the surface 14 deviates considerably from a standard value and/or if the diameter of the surface 22 deviates from a standard value. The ring 17 can be caused to undergo deformation axially and radially inwardly prior to start of or upon completion of the welding operation. This depends upon the need or the absence of need to resume the conveying of a flowable medium through the pipeline before the weld 13 is formed to permanently and positively seal the outer end of the annular clearance 15.

The pressure of the medium which is admitted into the plenum chamber 28 acts upon the ring 17 in a radial direction, whereas the fluid which enters the clearance 15 from the interior of the pipeline acts upon the radially innermost portion of the ring 17 in the direction of the axis of end portion 11, i.e., at right angles to the action of force which is applied to reduce the diameter of the inner surface 22. The pressure in the chamber 28 should suffice to ensure that the fluid in the interior of the pipeline cannot force the end portion 11 out of the sleeve 10 by acting against the right-hand end face of the end portion 11.

The pairwise arranged lips 19, 20 not only ensure the establishment of a highly satisfactory seal between the ring 17 and the tubular section 34 when the chamber 28 is maintained at an elevated pressure but such lips also ensure that the ring 17 is properly positioned in the groove 18 during insertion of the end portion 11 into the respective end portion of the sleeve 10.

The convexity of the inner surface 22 enhances the sealing action of the ring 17 when the latter is deformed to move into contact with the external surface 14 of the end portion. The area of contact between the ring 17 and the end portion 11 increases in response to an intensification of pressure in the chamber 28. The concave outer surface 24 of the ring 17 is desirable and advantageous because it ensures that the volume of the chamber 28 is not reduced to zero (i.e., that the surface 24 does not lie flush against the surface 23) when the ring 17 is not deformed. Moreover, the concave surface 24 ensures that the adjacent outer lips 20 are even more reliably pressed into sealing engagement with the respective lateral surfaces 21 when the pressure in the chamber 28 is increased.

The utilization of a sleeve which is relatively thick only in the regions of the two grooves is desirable and advantageous because of attendant savings in material and a reduction of the weight of the sleeve without affecting the quality of the sealing connection between such sleeve and the end portions 11 and 11'. The outer diameters of the beads 35, 35' are selected with a view to ensure that the depth of the grooves 18 will suffice for reception of rings having a requisite width (as measured in the radial direction of the rings).

The utilization of nitrogen as a medium for deforming the rings 17 is desirable at many locales of use where such gas is available anyway. Nitrogen is often used as a medium for rinsing gas pipes as well as a fire extinguishing medium. A liquid medium (particularly water) or a viscous medium (such as grease) will be used when a supply of compressed nitrogen is not readily available.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of sealingly connecting two tubular members having end portions one of which can be introduced into the other, particularly of establishing a welded connection between two pipes of a pipeline for compressed gaseous fluids, comprising the steps of providing the internal surface of the other end portion with a circumferentially complete groove having axially spaced apart side walls; inserting between the side walls of the groove a deformable ring-shaped seal; introducing the one end portion into the other end portion so that the free end of the other end portion and the seal surround the external surface of the one end portion; defoming the seal in the groove in a direction radially inwardly into sealing engagement with the introduced end portion and axially into sealing engagement with said side walls independently of the fluid in the pipeline; and thereupon bonding the free end of the other end portion to the one end portion.

2. The method of claim 1, wherein said deforming step includes introducing a pressurized flowable medium into the groove radially outwardly of the seal.

3. The method of claim 1, further comprising the step of conveying a compressed gaseous fluid through the end portions of the two members subsequent to said deforming step and prior to said bonding step.

4. In a pipeline, particularly for compressed gaseous fluids, the combination of a first tubular member including a first end portion having an external surface; a second tubular member including a second end portion having an internal surface surrounding said external surface, a free end, and a ring-shaped groove extending radially outwardly from said internal surface, said groove having axially spaced apart side walls; means for bonding said free end to said first end portion; a deformable ring between the side walls of said groove; and means for deforming said ring radially inwardly into sealing engagement with the external surface of said first end portion and axially into sealing engagement with said side walls independently of the fluid in the pipeline so as to allow for the application of said bonding means, particularly an annular weld, while the pressure in said tubular members deviates from the pressure of the surrounding atmosphere.

5. The structure of claim 4, wherein said second end portion has a bottom surface provided in said groove radially outwardly of said side walls and defining with said ring an annular plenum chamber, said deforming means including means for maintaining said chamber at a pressure which exceeds the pressure in said tubular members.

6. The structure of claim 5, wherein the pressure differential between said chamber and the interior of said tubular members approximates or exceeds 3 bar.

7. The structure of claim 5, wherein said ring has at least one first annular lip adjacent to one of said side walls and at least one second annular lip adjacent to the other of said side walls said lips surrounding said first end portion.

8. The structure of claim 7, wherein said ring has several first and second lips.

9. The structure of claim 5, wherein said ring has a convex inner surface adjacent to the external surface of said first end portion.

10. The structure of claim 5, wherein said ring has a concave outer surface adjacent to said plenum chamber.

11. The structure of claim 5, wherein said second end portion has an external surface and a passage extending from said chamber to the external surface of said second end portion, said deforming means including means for admitting into said chamber a pressurized flowable medium via said passage.

12. The structure of claim 11, wherein said admitting means comprises a conduit communicating with said passage and a shutoff valve in said conduit.

13. The structure of claim 5, wherein said second end portion has an external surface and a passage extending between said chamber and the external surface of said second end portion, and further comprising a plug sealingly received in said passage to seal said chamber from the surrounding atmosphere.

14. The structure of claim 5, wherein said second end portion includes a thin-walled first tubular section and a thick-walled second tubular section which is integral with said first section, said groove being provided in the internal surface of said second section.

15. The structure of claim 5, wherein said deforming means includes a supply of compressed gaseous fluid, particularly nitrogen, in said chamber.

16. The structure of claim 5, wherein said deforming means comprises a supply of pressurized hydraulic fluid, particularly water, in said chamber.

17. The structure of claim 5, wherein said deforming means comprises a supply of a viscous medium, particularly grease, in said chamber.

18. The structure of claim 4, wherein said second tubular member further comprises a third end portion having a second internal surface, a second free end and a second ring-shaped groove extending radially outwardly from said second internal surface and having two axially spaced apart side walls, and further comprising a third tubular member including a fourth end portion having a second external surface surrounded by said second internal surface and said second free end, second bonding means for bonding said second free end to said fourth end portion, a second deformable ring between the side walls of said second groove, and means for deforming said second ring radially into sealing engagement with said third end portion and axially against the side walls in said second groove so as to allow for the application of said second bonding means, particularly an annular weld, while the pressure in said tubular members deviates from the pressure in the surrounding atmosphere.

19. The structure of claim 18, wherein said second tubular member is a sleeve and said second and third end portions are substantially mirror symmetrical to each other with reference to a plane which is normal to the axis of said second tubular member and is disposed intermediate said free ends thereof.

20. The structure of claim 18, wherein each of said deforming means includes a supply of a pressurized flowable medium which is confined in the respective groove and surrounds the respective ring so that the latter is urged radially inwardly toward the corresponding external surface as well as axially into sealing engagement with the side walls in the groove of said second tubular member all the way around the respective external surface.

* * * * *